(12) United States Patent
Psaros

(10) Patent No.: US 6,871,809 B2
(45) Date of Patent: Mar. 29, 2005

(54) FISHING REEL AND SPOOL

(76) Inventor: Georgios Psaros, Sagstuguvagen 31, S-146 38 Tullinge (SE)

( * ) Notice: Subject to any disclaimer, the term of this patent is extended or adjusted under 35 U.S.C. 154(b) by 0 days.

(21) Appl. No.: 10/467,457

(22) PCT Filed: Jan. 24, 2002

(86) PCT No.: PCT/SE02/00115

§ 371 (c)(1),
(2), (4) Date: Aug. 7, 2003

(87) PCT Pub. No.: WO02/063953

PCT Pub. Date: Aug. 22, 2002

(65) Prior Publication Data

US 2004/0064997 A1 Apr. 8, 2004

(30) Foreign Application Priority Data

Feb. 12, 2001 (SE) ................................. 0100437

(51) Int. Cl.[7] ............................................. A01K 89/01
(52) U.S. Cl. ...................................................... 242/322
(58) Field of Search ................................. 242/282, 283, 242/317, 318, 322

(56) References Cited

U.S. PATENT DOCUMENTS

| 1,815,382 | A | | 7/1931 | Russell |
| 2,623,706 | A | * | 12/1952 | Von Pein ..................... 242/270 |
| 4,946,115 | A | | 8/1990 | Miiller |
| 5,372,325 | A | * | 12/1994 | Uehara et al. .............. 242/322 |
| 5,476,231 | A | * | 12/1995 | Hashimoto .................. 242/318 |
| 5,752,667 | A | | 5/1998 | Merrill et al. |
| 5,857,632 | A | * | 1/1999 | Arkowski .................... 242/297 |
| 5,921,492 | A | * | 7/1999 | Bauer .......................... 242/317 |
| 6,073,871 | A | | 6/2000 | Farris et al. |
| 6,575,392 | B1 | * | 6/2003 | Hong .......................... 242/319 |
| 2002/0023979 | A1 | * | 2/2002 | Gustafsson ................. 242/290 |
| 2002/0053618 | A1 | * | 5/2002 | Ochiai ......................... 242/323 |

FOREIGN PATENT DOCUMENTS

| DE | 3731554 A1 | 4/1989 |
| SE | 516 598 | 2/2002 |

* cited by examiner

Primary Examiner—Emmanuel Marcelo
(74) Attorney, Agent, or Firm—Young & Thompson

(57) ABSTRACT

A fishing reel (104) and spool (106) can be made as a more versatile kit (102) in that the fishing reel (104) includes a locking system adapted to interact with a circumferential area of the spool (106). changing spool (106) becomes easier with no loose parts and alternating between left and right hand becomes possible.

3 Claims, 3 Drawing Sheets

FISHING REEL AND SPOOL

Figure 1:
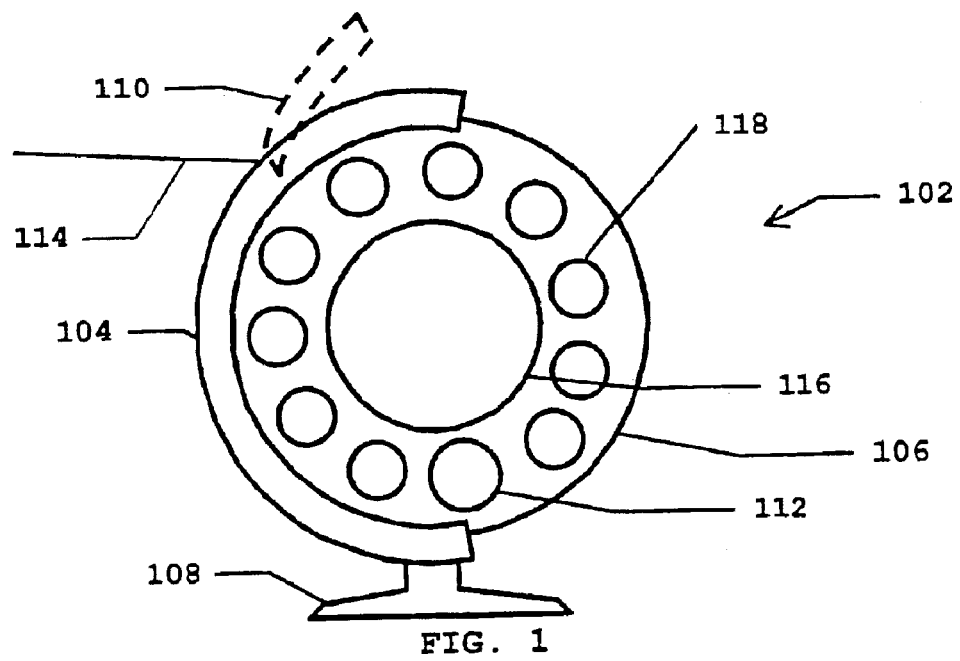

The following invention relates to a fishing reel.

The following invention also relates to a spool.

The following invention also relates to a kit comprising a fishing reel and spool.

In fishing, and in particular fly-fishing, it is very common to change between two or more spools. U.S. Pat. No. 4,946,115 disclose a fishing reel and spool where the spool and a braking element can be attached to the reel by magnetic force, thereby facilitating change of spool.

The known reel and spool comprise a shaft on which the spool and braking element are fit. This has the clear disadvantage that it is difficult to allow air to pass the line on the spool. The line will therefore not be able to dry in a satisfactory manner.

Another disadvantage (with all known reels and spools) is the difficulty in changing between left hand use and right hand use. The spool is asymmetrical. In order to change hand use an almost complete dissembling of the spool is required to adjust the handle to the other side of the spool and then a rewinding of the line. Often, there is a counter-weight that also must be moved.

Many fishers would actually prefer to alter between right and left hand use during fishing. They would use one hand on the spool handle when they lure the fish. When a fish bites, they would use the other hand on the handle to pull the fish in. Another situation where a change of hand would be beneficial is when catching a large fish, since it can take considerable time to land a large fish.

This has hitherto been impossible with all known reel and spool systems and the fishers are forced to use a less preferred action.

It is an object of the invention to provide a fishing reel that overcomes at least some of the problems and shortcomings mentioned above.

It is a further object of the invention to provide a spool that overcomes at least some of the problems and shortcomings mentioned above.

It is another object of the invention to provide a kit comprising a fishing reel and spool that overcomes at least some of the problems and shortcomings mentioned above.

Hitherto all reels and spools have been connected through an axle around which the spool will turn. With the present invention a completely new connection is realised. The reel comprises a novel and ingenious locking system. The locking system interacts with a circumferential area of the spool, thereby supporting or holding the spool at its outer part only. With a low friction element of the locking system being in contact with the circumferential area, the spool will move as easily as in any former system.

Basically, any known spool would be able to lock in the reel, since the circumferential area can be exactly the same as prior art spools.

In an advantageous embodiment the spool is provided with a groove that runs on the inside of each flange of the spool and the locking system acts outwards to lock the spool in place.

It is with the novel reel possible to equip the spool with one handle on each side to counter-weight each other. The fisher can then easily change between left and right hand to control the spool.

Other advantages and specifics will be apparent in the following detailed description of preferred embodiments of a reel and a spool according to the invention with reference to the figures.

Figure 2:
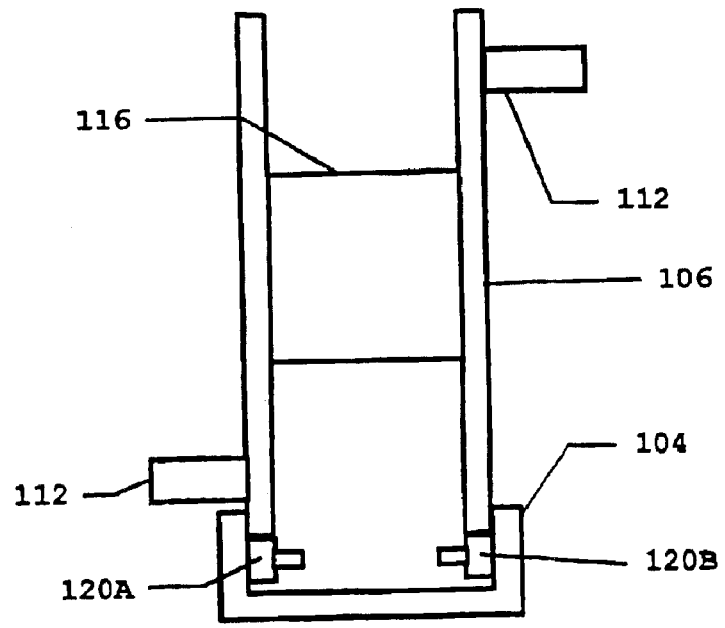
Figure 3:
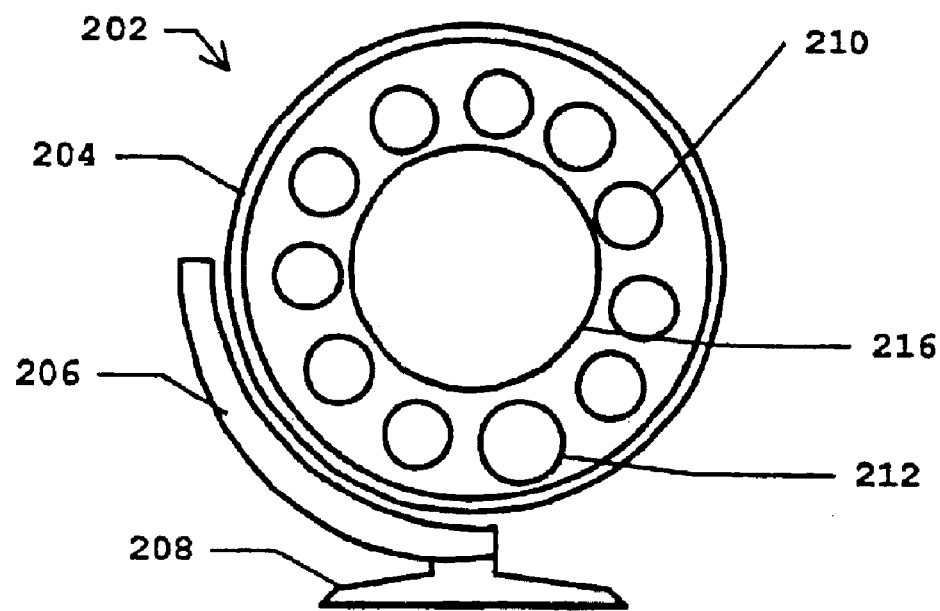
Figure 4:
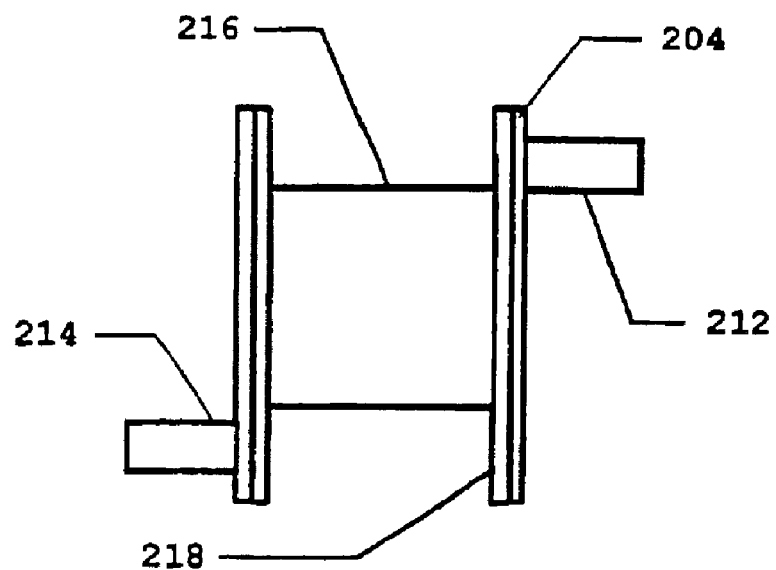
Figure 5:
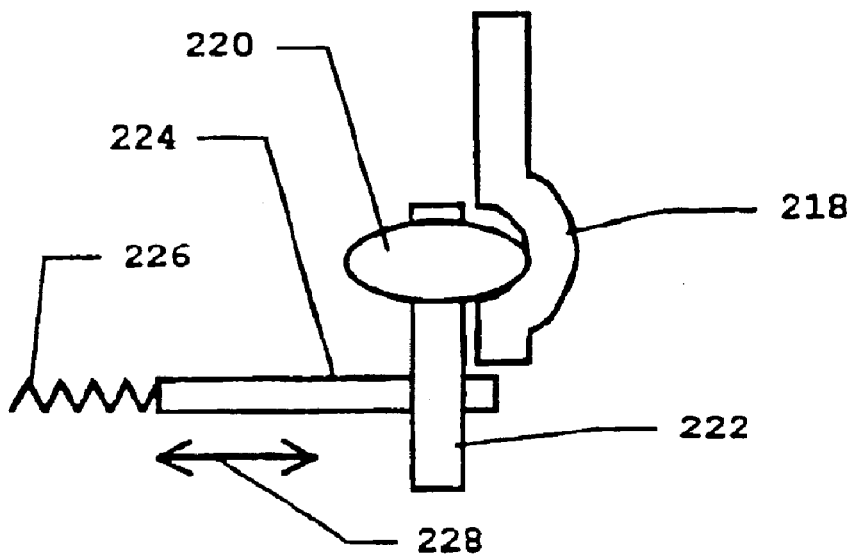
Figure 6:
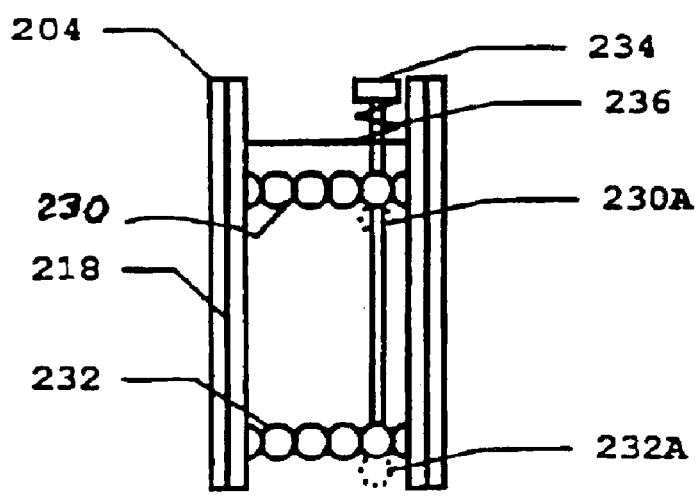

FIG. 1 shows a side view of a reel and a spool according to a first embodiment of the invention, FIG. 2 shows a different view of the reel and spool according to the first embodiment FIG. 3 shows a side view of a reel and a spool according to a second embodiment of the invention, FIG. 4 shows a different view of the spool according to the second embodiment, FIG. 5 shows a locking system of the reel according to the second embodiment interacting with a circumferential groove of the spool according to the second embodiment, and FIG. 6 shows an alternative embodiment of a locking system of the reel according to the second embodiment interacting with a circumferential groove of the spool according to the second embodiment.

FIGS. 1 and 2 show a first embodiment of the invention in form of a kit 102 comprising a reel 104 holding a spool 106. The reel 104 can be attached to a fishing rod (not shown) via a mounting bracket 108.

The reel 104 is C-shaped and in the shown embodiment covers just over 180° of the spool 106. This is enough to retain the spool 106 in an attached position. The C-shaped reel 104 can be made of a material having such elasticity that the spool 106 easily can be attached and removed by overcoming the biasing force caused by the elasticity of the material. The spool 106 has a normal straight edge which is utilised for the interaction with the reel 104.

An alternate construction is indicated at 110, whereby a section of the reel 104 can be opened up for attaching or detaching the spool 106. This alternate construction could basically be extended so that the reel is formed by two C-shaped parts. The parts could be held together by a hinge or similar and lockable at the other end. The reel would then completely enclose the spool.

As indicated in FIG. 2, there are a number of low friction elements 120A, 120B ascertaining that the spool 106 can turn freely with as little friction as possible. Preferably, three sets of these elements 120A, 120B are used, two of the sets of elements 120A, 120B being displaced by at least 180°. The elements 120A, 120B could be bearings with a plastic covering or other noise reductive covering.

Yet another possibility (not shown) is to use magnetic force to hold the reel 104 and spool 106 together. The C-shape can then be less than 180°.

All these possibilities are facilitated by having the reel 104 facing the pulling direction. In FIG. 1 this is indicated by line 114. When a fish pulls, the spool 106 will be forced into the C-shaped reel 104.

It can here be noted that the C-shaped reel 104 could essentially consist of an open frame construction, basically only containing the sets of elements 120A, 120B held together by bent rods or profiled material (e.g. aluminium). This further facilitates the access of air to the line 114 for drying it. Holes 118 are also present on the spool 106 itself and a drum 116 of the spool 106 can also include large areas letting air pass through to dry the line.

A handle 112 can be placed on each side of the spool 106 (i.e. one handle on each side) for providing counter-weight and facilitate selection of which hand to use for winding the line 114.

FIG. 3 shows a second embodiment of the invention in form of a kit 202 comprising a spool 204 mounted in a reel 206. The reel 206 can be attached to a fishing rod (not shown) via a mounting bracket 208. The spool 204 has holes 210 to allow air to pass through the fishing line to dry it. The spool also has a first handle 212 for controlling the spool 204.

As can be seen in FIG. 4, which shows the spool 204 from a side view, the spool also has a second handle 214.

The first handle 212 and the second handle 214 acts as counter-weights to each other. The fisher can therefore use any of the handles 212, 214 for controlling the spool 204.

The spool 204 also has a drum 216, on to which the line can be wound. The drum 216 can also be provided with holes (not shown) for improving drying of the line.

In order to attach the spool 204 to the reel 206, the spool 204 is made with a circumferential groove 18 along both flanges.

The attachment of the spool 204 to the reel 206 can be more clearly seen in FIG. 5. Although the invention provides a more versatile and easy to use kit of reel and spool than previously known, the attachment per se between reel and spool can be a straightforward construction of a kind that is well known. In FIG. 5 only a small part of the spool 204 and reel 206 is therefore shown.

The circumferential groove 218 is made to receive a bearing 220. One set of bearings may be sufficient, but two or three sets of bearings are preferably used to hold the spool 204 in place. These sets are preferably evenly distributed along the attachment area between reel 206 and spool 204. (See also FIG. 3.)

The bearing 220 is connected to an arm 222, which in turn is connected to a rod 224. The rod 224 is biased towards the groove 218 by a spring 226. On the other side of the spring 226, corresponding components are connected to a matching bearing for attachment with the other groove of the spool (not shown). Each pair of bearings is made in the same way.

The arm 222 also acts as a release means. By pressing the arm 222 against the bias of spring 226, the bearing 220 is moved out of the groove 218 and the spool 204 can be removed from the reel 206. For most convenient use, all pairs of bearings are connected so that all pairs are released at the same time.

This simplifies the mounting of the spool 204 to the reel 206. Changing between spools (204) thus becomes much easier. There are no loose parts that can be lost.

Another embodiment is shown in FIG. 6. The spool is again indicated with numeral 204 and the groove is indicated as numeral 218. In this alternative embodiment the locking system includes several sets of balls (a first set 230 and a second set 232 is shown). Each set comprises an even number of balls, in this case 206, situated between the grooves 218 on each flange. This locks the spool 204 to the reel.

In order to release the spool 204 a release means 234, which is normally biased by a spring 236. When the release means 2234 is pressed against the biasing spring 236 one ball 230A, 232A in each set 230, 232 is pushed out of the set 230, 232 (indicated in broken lines) and the spool 204 can be removed. When the release means 234 is no longer pressed on, the spring 236 returns the release means 234 to its normal position and the ball 230A, 232A is returned to its position in each set 230, 232. The spring 236 thus acts as a bias means in a locking direction for the locking system since it retains the balls within each set 230, 232.

All sets of balls 230, 232 can be held in a specific tube or holder running along (part of) the circumference of the reel (not shown).

There are many alternatives that are useable to make a similar attachment between reel and spool. For instance, biasing need not be done with a spring. Other low friction elements than bearings can be used. Other means for releasing the hold of the spool are also well known to persons skilled in the art of releasable assembly.

Similarly, the groove can be placed on the outside of the flanges of the spool, so the locking system grips the spool from the outside. The internal assembly, however, is preferable since it interferes to a lesser degree with the handling of the spool.

The locking system can also hold the spool from both sides on one or both flanges.

The groove can be shaped in many ways, not only as a C, as shown in the embodiment of the figures.

What is claimed is:

1. Fishing reel (104; 206) adapted for releasable coupling with a spool (106; 204), characterised in that the reel (104; 206) comprises a locking system (110; 120A, 120B; 220, 222, 224, 226; 230, 232, 234, 236) adapted to interact with a circumferential area (218) of the spool (106; 204), wherein the locking system comprises at least one low friction component (120A, 120B; 220; 230, 232) adapted to interact by physical contact with the circumferential area (218), and wherein the low friction component(s) include bearings (220).

2. Fishing reel (104; 206) adapted for releasable coupling with a spool (106; 204), characterised in that the reel (104; 206) comprises a locking system (110; 120A, 120B; 220, 222, 224, 226; 230, 232, 234, 236) adapted to interact with a circumferential area (218) of the spool (106; 204), wherein the locking system comprises a bias means (110; 226; 236) acting in a locking direction.

3. Fishing reel according to claim 2, characterised in that the locking system further comprises a release means (222; 234) for enabling countering of the force of the bias means (226; 236).

* * * * *